(12) United States Patent
Wang et al.

(10) Patent No.: US 11,726,994 B1
(45) Date of Patent: Aug. 15, 2023

(54) PROVIDING QUERY RESTATEMENTS FOR EXPLAINING NATURAL LANGUAGE QUERY RESULTS

(71) Applicant: Amazon Technologies, Inc., Seattle, WA (US)

(72) Inventors: Jun Wang, Jersey City, NJ (US); Zhiguo Wang, Syosset, NY (US); Sharanabasappa Parashuram Revadigar, Bronxville, NY (US); Ramesh M Nallapati, New Canaan, CT (US); Bing Xiang, Mount Kisco, NY (US); Sudipta Sengupta, Sammamish, WA (US); Yung Haw Wang, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/219,694

(22) Filed: Mar. 31, 2021

(51) Int. Cl.
*G06F 16/242* (2019.01)
*G06F 16/2452* (2019.01)
*G06F 16/28* (2019.01)
*G06F 16/248* (2019.01)
*G06F 16/2457* (2019.01)

(52) U.S. Cl.
CPC .......... *G06F 16/243* (2019.01); *G06F 16/248* (2019.01); *G06F 16/24522* (2019.01); *G06F 16/24573* (2019.01); *G06F 16/287* (2019.01)

(58) Field of Classification Search
CPC ............. G06F 16/243; G06F 16/24573; G06F 16/287; G06F 16/24522; G06F 16/248; G06F 16/532
See application file for complete search history.

(56) References Cited

U.S. PATENT DOCUMENTS

| | | |
|---|---|---|
| 7,475,010 B2 | 1/2009 | Chao |
| 7,526,425 B2 | 4/2009 | Marchisio et al. |
| 8,301,438 B2 | 10/2012 | Ferrucci et al. |
| 8,856,096 B2 | 10/2014 | Marchisio et al. |
| 8,983,994 B2 | 3/2015 | Neels et al. |
| 9,135,238 B2 | 9/2015 | Bunescu et al. |
| 9,703,861 B2 | 7/2017 | Brown et al. |
| 9,798,748 B2 | 10/2017 | Brocato |
| 10,303,999 B2 | 5/2019 | Hertz et al. |
| 10,304,444 B2 | 5/2019 | Mathias et al. |

(Continued)

OTHER PUBLICATIONS

U.S. Appl. No. 17/219,656, filed Mar. 31, 2021, Wang, et.

(Continued)

*Primary Examiner* — Yuk Ting Choi
(74) *Attorney, Agent, or Firm* — S. Scott Foster; Kowert, Hood, Munyon, Rankin & Goetzel, P.C.

(57) ABSTRACT

Query restatements may be provided for explaining natural language query results. A natural language query is received at a natural language query processing system. An intermediate representation of the natural language query is generated for executing the natural language query. The intermediate representation is translated into a natural language restatement of the natural language query. The natural language restatement is provided with a result of the natural language query via an interface of the natural language query processing system.

20 Claims, 10 Drawing Sheets

(56) References Cited

U.S. PATENT DOCUMENTS

| | | | |
|---|---|---|---|
| 10,318,586 B1 * | 6/2019 | Rose | G06F 16/285 |
| | | | 707/999.004 |
| 10,657,125 B1 | 5/2020 | Gautam et al. | |
| 10,747,761 B2 | 8/2020 | Zhong et al. | |
| 10,956,469 B2 | 3/2021 | Butler | |
| 10,984,051 B2 | 4/2021 | Sezgin | |
| 11,086,861 B2 * | 8/2021 | Staar | G06F 40/30 |
| | | | 707/999.003 |
| 11,301,502 B1 | 4/2022 | Dijamco | |
| 11,360,969 B2 | 6/2022 | Lal | |
| 2003/0217052 A1 | 11/2003 | Rubenczyk et al. | |
| 2005/0262051 A1 * | 11/2005 | Dettinger | G06F 16/24573 |
| | | | 707/999.003 |
| 2008/0016049 A1 * | 1/2008 | Dettinger | G06F 16/24522 |
| | | | 707/999.004 |
| 2011/0131216 A1 | 6/2011 | Chakravarthy et al. | |
| 2012/0254143 A1 | 10/2012 | Varma et al. | |
| 2016/0041986 A1 | 2/2016 | Nguyen | |
| 2016/0350406 A1 | 12/2016 | Byron | |
| 2017/0212895 A1 | 7/2017 | Ahmed | |
| 2018/0060422 A1 | 3/2018 | Wegryn | |
| 2018/0121500 A1 * | 5/2018 | Reschke | G06F 16/243 |
| | | | 707/999.003 |
| 2018/0196871 A1 | 7/2018 | Butler | |
| 2018/0218042 A1 | 8/2018 | Krishnan | |
| 2018/0329993 A1 | 11/2018 | Bedadala et al. | |
| 2019/0095444 A1 | 3/2019 | Payne | |
| 2019/0197185 A1 | 6/2019 | Miseldine | |
| 2020/0034362 A1 | 1/2020 | Galitsky | |
| 2020/0073983 A1 | 3/2020 | Sen | |
| 2020/0117737 A1 | 4/2020 | Gopalakrishnan | |
| 2020/0302122 A1 | 9/2020 | Lai | |
| 2020/0372219 A1 | 11/2020 | Relangi et al. | |
| 2021/0042307 A1 | 2/2021 | Mustafi | |
| 2021/0390099 A1 | 12/2021 | Rahmfeld | |
| 2022/0121656 A1 | 4/2022 | Zheng | |
| 2022/0138216 A1 | 5/2022 | Kesarwani | |

OTHER PUBLICATIONS

U.S. Appl. No. 17/219,689, filed Mar. 31, 2021, Nallapati, et.
U.S. Appl. No. 17/219,706, filed Mar. 31, 2021, Wang, et.
U.S. Appl. No. 17/537,273, filed Nov. 29, 2021, Wang, et.
U.S. Appl. No. 18/182,303, filed Mar. 10, 2023, Nallapati, et al.

* cited by examiner

PROVIDING QUERY RESTATEMENTS FOR EXPLAINING NATURAL LANGUAGE QUERY RESULTS

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the number, size and complexity of data storage and management technologies that are used to perform various operations and services, such as utilizing the features of database systems, object stores, and data streams, which in turn escalate the cost of maintaining the information. Moreover, as different data storage technologies offer different performance benefits and features, tailoring the location of data to a data storage technology that provides performance and analysis benefits for that data may result in different data sets being spread across many different locations and types of storage systems.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques of interactive assistance for executing natural language queries to data sets are described herein. In large enterprises, hundreds or thousands of data sets may be stored across different data storage systems. These data sets may be made up of large fact/dimension tables and many reporting views that aggregate and transform their data across various dimensions. For users attempting to utilize this information (e.g., for business intelligence or other analytics), various challenges related to knowing what data sets are available (and the contents of data sets) and how to interact with the various storage systems or other technologies storing data sets. In various embodiments, natural language query processing may be implemented to provide users with an interface to submit queries for requested data without having to understand or directly utilize underlying data storage system interfaces. Moreover, in some embodiments, natural language queries may allow for data discovery so that a natural language query need not explicitly specify the data sets to which query is directed.

Figure 1:
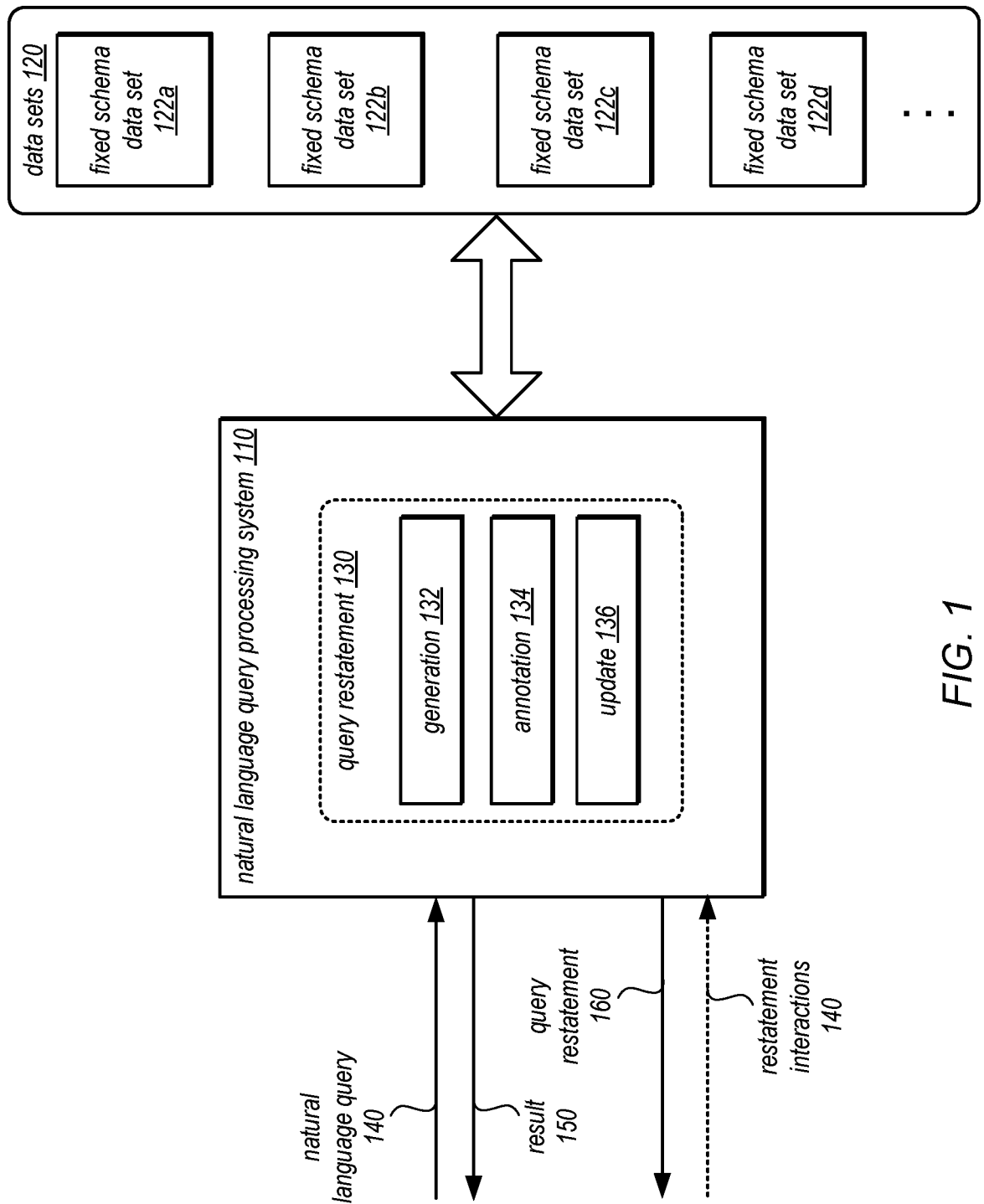
FIG. 1 illustrates a logical block diagram illustrating providing query restatements for explaining natural language query results, according to some embodiments.

To support natural language query processing, techniques to explain the operation of natural query language processing may be implemented in various embodiments, such as natural language restatements of natural language queries. For example, as natural language queries may not explicitly identify data sets to query, natural language restatements can help to verify which data sets (or the data taken from data sets) is used to answer the natural language query. As natural language query results may be displayed visually, using various graphs or other visualizations, such explanations may provide a user with additional data to verify whether the visualization is a correct answer. Moreover, natural language restatements may provide an easily understandable representation explanation of natural language query results (e.g., unlike a query language restatement or other restatement using data set specific knowledge, which may not be known to a user as the user submitting a query may not have provided or be aware of the underlying data set and the interface, language, or protocol for accessing the underlying data set). FIG. 1 illustrates a logical block diagram illustrating providing query restatements for explaining natural language query results, according to some embodiments.

Natural language query processing system 110 may be implemented to provide access to various fixed schema data sets 120, which may include data stores 122*a*, 122*b*, 122*c*, 122*d*, and so on, stored across one or multiple different data storage systems or technologies. Fixed schema data sets 122 may be structured data sets, in some embodiments, where rows, columns, fields (or cell values), or other structure may be utilized to logically organize data stored according to a fixed schema (e.g., a data model or other pre-defined set of rules, constraints, or other information that defines the relationships between data in a data set, such as the number of columns, names of columns, types of data in columns, etc.) in data sets 122. Data sets may be tables, for example, which are stored according to a fixed schema that describes the number of columns, names of columns, and types of data in the columns of the table.

Natural language query processing system 110 may be implemented as part of a data storage system (e.g., as part of a database system, object-based storage system, file system, or other storage system), or, as discussed below with regard to FIG. 2, implemented as part of a business intelligence service or other analytics platform. Natural language query processing system 110 may implement an interface that supports receiving natural language queries, such as natural language query 140. A natural language query 140 may not conform to any specify query language or other structured language, protocol, or parameters for interfacing with specific data storage systems for fixed schema data sets 122 and/or natural language query processing system 110, but instead may exhibit natural human language features including various verbs, nouns, clauses, phrases, or other human syntax for expressing a query for a result generated or returned from fixed schema data sets 122, in various embodiments. As a result, natural language queries may include multiple formulations of input words that may query for the same result. Natural language query 140 may be received as (or transcribed into) a text string, in some embodiments, which may be processed by natural language query processing system 110 into an intermediate representation (according to the various techniques discussed below with regard to FIGS. 2-10). The intermediate representation may then be used to generative the appropriate queries, requests, or other interactions with storage systems that store fixed schema data sets 122 in order to generate a desired result for natural language query, which may be provided as indicated at 150. Such a result 150 may be returned as a text-based result and/or may be used to generate various result displays (e.g., various charts, graphs, or other visualizations of data that answers the natural language query) as result 150.

Natural language query processing system 110 may implement query restatement features 130 in order to explain, and thus improve, the performance of submitted natural language queries, such as query 140, when providing a result 150. For example, as discussed in detail below with regard to FIGS. 6-9, restatement generation 132 may provide a translation of an intermediate representation of a natural language query 140 predicted according to various generation techniques discussed below. In some embodiments, a template or other pre-defined structure may be identified and populated with entities and other information recognized in the natural language query. In some embodiments, other natural language restatement techniques, such as machine learning model based techniques (e.g., which decode the intermediate representation into a natural language statement). The query restatement 160 may be provided along with result 150, in various embodiments.

Query restatement 130 may also provide annotation 134, in some embodiments. Annotation 134 may include further metadata that describes how the entities or other recognized features of a natural language query are obtained. For example, information such as a column or cell-value, operation type (e.g., aggregation or filter), and/or source data set (e.g., by name) may be included as an annotation to a query restatement 160. A word or location of the restatement may be selected and the annotation provided in response, in some embodiments. In some embodiments, the annotation may be stored as an update to metadata for a corresponding fixed schema data set 122 (e.g., to be used for subsequent natural language queries).

Query restatement 130 may also provide representation update 136, in some embodiments. Update 136 may support an interface or other interactions 140 with a query restatement. For example, a modification to an annotation may be received, which may cause the natural language query to be re-executed using an updated intermediate representation according to the updated intermediate representation, as discussed below with regard to FIG. 9. In some embodiments, a modification to an annotation may be stored and used to train or update an intermediate representation generation model, such as intermediate representation generation model 530 in FIG. 5.

Please note that the previous description of query restatements for explaining natural language query results is a logical illustration and thus is not to be construed as limiting as to the implementation of natural language query processing systems 110, or various other features, like data sets 122. Different combinations or implementations may be implemented in various embodiments.

This specification begins with a general description of a provider network that implements a business intelligence service that supports natural language querying. Then various examples of natural language query processing including different components/modules, or arrangements of components/module that may be employed as part of implementing the business intelligence service are discussed. A number of different methods and techniques to implement query restatements for explaining natural language query results are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
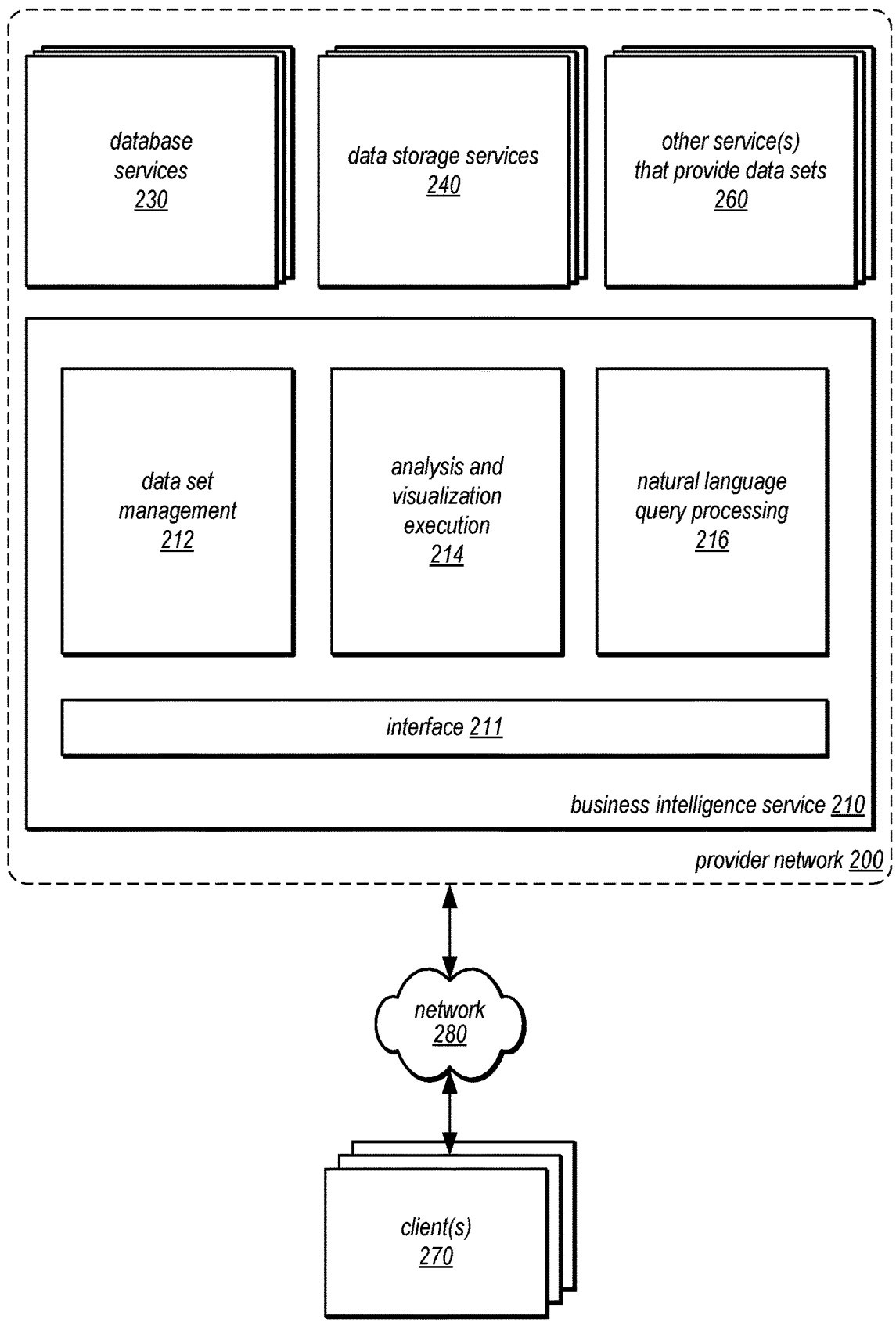
FIG. 2 is a logical block diagram illustrating a provider network offering a business intelligence service that implements natural language query processing, including various data storage and processing services, according to some embodiments.

FIG. 2 is a logical block diagram illustrating a provider network offering a business intelligence service that implements natural language query processing, including various data storage and processing services, according to some embodiments. Provider network 200 may be a private or closed system or may be set up by an entity such as a company or a public sector organization to provide one or more services (such as various types of cloud-based storage) accessible via the Internet and/or other networks to clients 270, in some embodiments. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and services offered by the provider network 200. In some embodiments, provider network 200 may implement various computing systems, platforms, resources, or services, such as a business intelligence service 210, compute services, database service(s) 230, (e.g., relational or non-relational (NoSQL) database query engines, map reduce processing, data flow processing, and/or other large scale data processing techniques), data storage service(s) 240, (e.g., an object storage service, block-based storage service, or data storage service that may store different types of data for centralized access), data stream and/or event services, and other services (any other type of network based services (which may include various other types of storage, processing, analysis, communication, event handling, visualization, and security services not illustrated), including other service(s) 250 that provide or generate data sets for access by business intelligence service 210.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

In various embodiments, business intelligence service 210 may provide a scalable, serverless, and machine-learning powered service to create visualizations and analysis for data (e.g., dashboards) to include in various applications (e.g., websites) accessing various data sets, such as data stored in database services 230, data storage services 240, or other services 250. Business intelligence service 210 may implement interface 211, which may be implemented as various types of programmatic (e.g., Application Programming Interfaces (APIs)), command line, and/or graphical user interfaces to support the management of data sets for analysis, request, configure, and/or otherwise obtain new or existing analysis, and/or perform natural language queries, as discussed below.

Business intelligence service 210 may implement data set management 212, in various embodiments. Data set management 212 may allow users to upload, identify, describe, augment, annotate, or otherwise prepare data sets for access, analysis, and/or visualization by business intelligence service 210. For example, various requests to describe data, such as provide descriptions of columns, field values, or other information, which may be used enhance information that may be found in a data storage system (e.g., data in addition to a database schema or other table description). As discussed below with regard to FIGS. 3-5, such metadata may be used as part of natural language query processing in some embodiments (e.g., as inputs to machine learning models).

Business intelligence service 210 may implement analysis and visualization execution 214, which may perform the various operations to access data, analyze data, and/or generate a corresponding visualization. For example, analysis and visualization 214 may understand and generate corresponding requests to obtain data from different database service(s) 230, data storage service(s) 240, or other service(s) 250 according to the corresponding interfaces supported by those services (e.g., query language, API, protocols, etc.). Analysis and visualization 214 may be able to perform various data processing operations to determine generate requested results (e.g., applying various aggregation, statistical analyses, or other operations). Analysis and visualization 214 may also be able to determine the type of visualization to provide the results (e.g., bar graphs, charts, or other displays, that illustrate the requested analysis. Analysis and visualization 214 may be invoked using an intermediate representation, generated as discussed below with regard to FIGS. 3-6, in some embodiments, in order to provide results (including visualizations) for natural language queries, in some embodiments.

Business intelligence service 210 may implement natural language query processing 216, as discussed in detail below with regard to FIGS. 3-6, in order to handle responses to natural language queries to perform analysis and visualization using business intelligence service, in some embodiments.

In various embodiments, database services 230 may be various types of data processing services that perform general or specialized data processing functions (e.g., analytics, big data querying, time-series data, graph data, document data, relational data, structured data, or any other type of data processing operation) over data that is stored across multiple storage locations, in some embodiments. For example, in at least some embodiments, database services 210 may include various types of database services (e.g., relational) for storing, querying, and updating data. Such services may be enterprise-class database systems that are scalable and extensible. Queries may be directed to a database in database service(s) 230 that is distributed across multiple physical resources, as discussed below, and the database system may be scaled up or down on an as needed basis, in some embodiments. The database system may work effectively with database schemas of various types and/or organizations, in different embodiments. In some embodiments, clients/subscribers may submit queries or other requests (e.g., requests to add data) in a number of ways, e.g., interactively via an SQL interface to the database system or via Application Programming Interfaces (APIs). In other embodiments, external applications and programs may submit queries using Open Database Connectivity (ODBC) and/or Java Database Connectivity (JDBC) driver interfaces to the database system.

In some embodiments, database services 220 may be various types of data processing services to perform different functions (e.g., query or other processing engines to perform functions such as anomaly detection, machine learning, data lookup, or any other type of data processing operation). For example, in at least some embodiments, database services 230 may include a map reduce service that creates clusters of processing nodes that implement map reduce functionality over data stored in one of data storage services 240. Various other distributed processing architectures and techniques may be implemented by database services 230 (e.g., grid computing, sharding, distributed hashing, etc.). Note that in some embodiments, data processing operations may be implemented as part of data storage service(s) 230 (e.g., query engines processing requests for specified data).

Data storage service(s) 240 may implement different types of data stores for storing, accessing, and managing data on behalf of clients 270 as a network-based service that enables clients 270 to operate a data storage system in a cloud or network computing environment. For example, one data storage service 230 may be implemented as a centralized data store so that other data storage services may access data stored in the centralized data store for processing and or storing within the other data storage services, in some embodiments. Such a data storage service 240 may be implemented as an object-based data store, and may provide storage and access to various kinds of object or file data stores for putting, updating, and getting various types, sizes, or collections of data objects or files. Such data storage service(s) 230 may be accessed via programmatic interfaces (e.g., APIs) or graphical user interfaces. A data storage service 240 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In various embodiments, data stream and/or event services may provide resources to ingest, buffer, and process streaming data in real-time, which may be a source of data sets. In some embodiments, data stream and/or event services may act as an event bus or other communications/notifications for event driven systems or services (e.g., events that occur on provider network 200 services and/or on-premise systems or applications).

Generally speaking, clients 270 may encompass any type of client configurable to submit network-based requests to provider network 200 via network 280, including requests for materialized view management platform 210 (e.g., a request to create a materialized view from different data sources of the other provider network services and identify one or more as a target data source). For example, a given client 270 may include a suitable version of a web browser, or may include a plug-in module or other type of code module that may execute as an extension to or within an execution environment provided by a web browser. Alternatively, a client 270 may encompass an application such as a database application (or user interface thereof), a media application, an office application or any other application that may make use of resources in in provider network 200 to implement various features, systems, or applications. (e.g., to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application may interact directly with provider network 200. In some embodiments, client 270 may generate network-based services requests according to a Representational State Transfer (REST)-style network-based services architecture, a document- or message-based network-based services architecture, or another suitable network-based services architecture.

In some embodiments, a client 270 may provide access to provider network 200 to other applications in a manner that is transparent to those applications. For example, client 270 may integrate with an operating system or file system to provide storage on one of data storage service(s) 240 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 240 may be coordinated by client 270 and the operating system or file system on behalf of applications executing within the operating system environment.

Clients 270 may convey network-based services requests (e.g., natural language queries) to and receive responses from provider network 200 via network 280. In various embodiments, network 280 may encompass any suitable combination of networking hardware and protocols necessary to establish network-based-based communications between clients 270 and provider network 200. For example, network 280 may generally encompass the various telecommunications networks and service providers that collectively implement the Internet. Network 280 may also include private networks such as local area networks (LANs) or wide area networks (WANs) as well as public or private wireless networks. For example, both a given client 270 and provider network 200 may be respectively provisioned within enterprises having their own internal networks. In such an embodiment, network 280 may include the hardware (e.g., modems, routers, switches, load balancers, proxy servers, etc.) and software (e.g., protocol stacks, accounting software, firewall/security software, etc.) necessary to establish a networking link between given client 270 and the Internet as well as between the Internet and provider network 200. It is noted that in some embodiments, clients 270 may communicate with provider network 200 using a private network rather than the public Internet.

Figure 3:
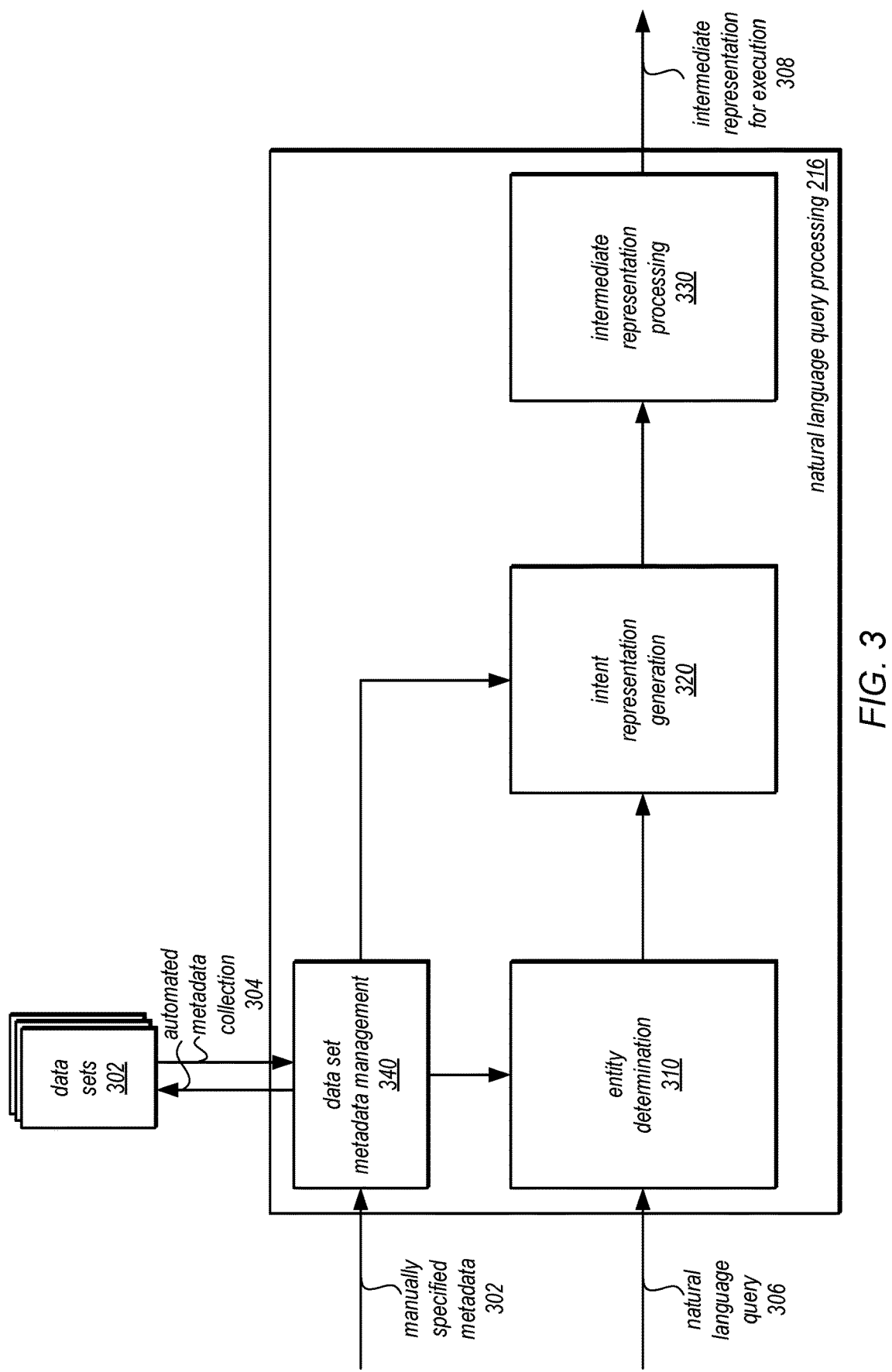
FIG. 3 is a logical block diagram illustrating a natural language query processing pipeline, according to some embodiments.

FIG. 3 is a logical block diagram illustrating a natural language query processing pipeline, according to some embodiments. Natural language query processing 216 may utilize metadata for various data sets 302 in order to perform various pipeline stages, such as entity determination 310 and intermediate representation generation 320. Data asset metadata management 340 may support features to obtain or accept manually specified metadata 302, in some embodiments. For example, different data sets may be created, identified, or managed for access by natural language query processing 216. Various synonyms, alias, descriptions, possible cell values, or other metadata that describes the content of data sets beyond the existing data set provided information (e.g., data that is in addition to metadata which could be obtained from the contents of the data set and/or schema information maintained for the data set). Data set metadata management 340 may support organizing structures or groupings to identify common sets of metadata for multiple data sets (e.g., those data sets likely to be accessed for some types of natural language queries), which may be referred to as topics, in some embodiments.

For example, database objects (columns, cell values, named expressions) often lack self-explanatory names and are, instead, named for the ease of business intelligence (BI) engineers with deep experience and familiarity of code names used in data processing (e.g., a column might be named "num_accts" rather than the more verbose and semantically obvious number of accounts or a product might be referenced by its "SKU" rather than the name by which regular users refer to it). These names may pose a challenge to natural language question answering algorithms that link entities referenced in query text from average business users (who are not necessarily familiar with data modeling of the underlying databases) to the corresponding database objects. To overcome these lexical and semantic gaps, manually specified metadata can augment database schemas with metadata that can be used by algorithms (e.g., various machine learning models natural language query processing pipeline stages discussed below) to improve question answering.

In addition to manually specified metadata, data set metadata management 340 may collect metadata from the data sets, as indicated at 304. For example, queries to sample data, obtain schema information, access data set statistics (e.g., cardinality), or other information may be performed. Data set metadata management 340 may group, organize or structure metadata for data sets together as a snapshot or other collection of information that may be passed to different stages, so that each stage may utilize the context such metadata provides as part of processing a natural language query 306. For example, as discussed in detail below with regard to FIG. 4, data set metadata management 340 may also generate metadata snapshots which may provide a subset of metadata information for a candidate set of data sets for natural language query processing without providing the entirety of all possible metadata for all available data sets.

Natural language query processing 216 may implement multiple processing stages for executing natural language queries, like query 306. Entity determination stage 310 may determine or otherwise recognize the entities in a natural language query, as discussed in detail below with regard to FIG. 4. Intermediate representation generation 320 may determine the linkages, data sets, and intermediate representation of a natural language query for execution, as discussed in detail below with regard to FIG. 5. In FIG. 6, intermediate representation processing 330 is discussed in detail which may enhance and ready an intermediate representation for execution, as indicated at 308.

Figure 4:
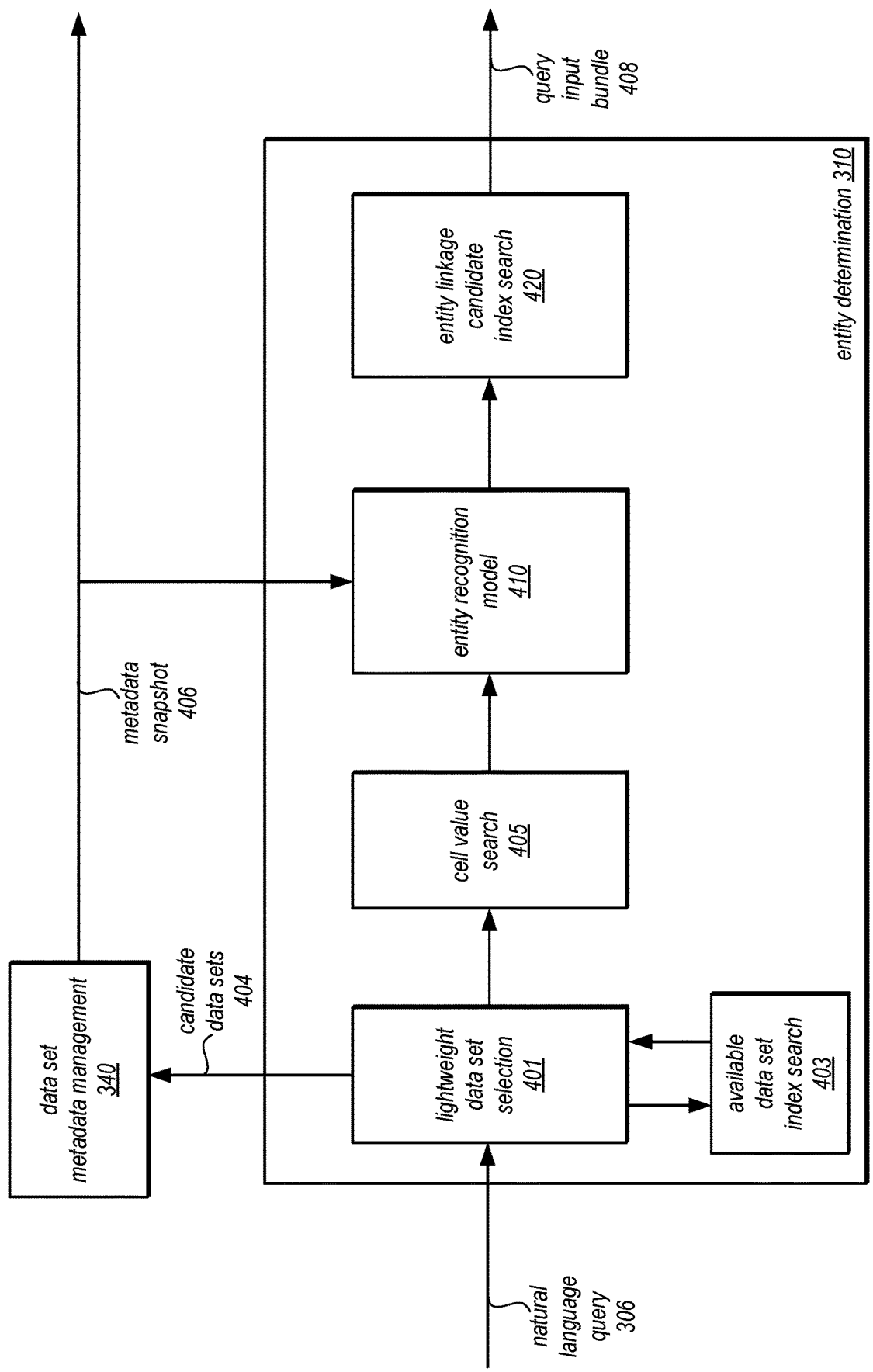
FIG. 4 is a logical block diagram illustrating entity determination for processing a natural language query, according to some embodiments.

FIG. 4 is a logical block diagram illustrating entity determination for processing a natural language query, according to some embodiments. Entity determination 310 may recognizes entities in a natural language query as well as identify linkages (e.g., mappings or other links to columns of a data set) for those entities. In various embodiments, entity determination 310 may implement lightweight data set selection 401. Lightweight data set selection may provide a first pass or initial selection of possible data sets to use for providing a result to natural language query 306. For example, lightweight data set selection 401 may determine from the data sets available to be accessed for natural language query 306 (e.g., those data sets associated with a common user account), a sub-set of available data sets to be a candidate set of data sets 404.

Lightweight data set selection 401 may utilize available data set index search 403, in some embodiments, in order to determine candidate data sets. For example, available data set index search 403 may have indexed metadata for available data sets (e.g., both enhanced metadata, such as metadata that may be manually or automatically collected from schemas or other data sets directly specified as discussed above with regard to FIG. 3). The metadata may include global (e.g., account wide synonyms, or domain (sometimes referred to as a topic) synonyms, column names, column aliases, or other information describing the data sets. Available data set index search 403 may use text of natural language query 306 to search the metadata index and identify possible column matches of the available data sets for the natural language query. The search string may be passed after removing stop indications or other features not relevant for data set selection, in some embodiments. The search may be performed using a search API or other interface and may allow for non-exact or "fuzzy" matches.

Lightweight data set selection 401 may then take the possible column matches from available data set index search 403 and rank those available data sets with possible column matches according to a respective similarity score determined for those available data sets with possible column matches, in some embodiments. For example, a similarity score, such as Okapi Best Matching (BM)25 or other measure of textual similarity may be determined for individual columns and then aggregated for each data set as a whole (e.g., as a single data set may be used to answer the natural language query in some embodiments). Lightweight data set selection 401 may then take a subset of those available data sets with possible column matches according to their similarity scores. For example, a top X number of data sets may be selected. These selected data sets may be the candidate data sets 404 that are provided to data set management 340.

Data set metadata management 340 may take the candidate data sets 404 and obtain those data sets metadata (e.g., from automated and manually specified sources) to generate metadata snapshot 406. Metadata snapshot 406 may be used by various stages of natural language query processing 216 to inform analysis. As metadata snapshot 406 can represent a significantly reduced set of metadata than if all the metadata of all available data sets were provided to natural language query processing 216 (e.g., reduced from the metadata for thousands or hundreds of thousands of data sets to 20 data sets), metadata snapshot 406 can improve the performance of natural language query processing by providing relevant information to conduct a rich analysis of metadata at various processing stages in an efficient manner as the amount of metadata provided is significantly reduced.

Below is an example of a metadata snapshot 406 which may be provided:

```
{
"datasets" : [
  {
    "domainId": "mDuNOhUPGWEgK978uB3Ug1VoMYAf7ekS",
    "datasetid": "b767e871-5aa6-4072-80b4-a179aa517f56",
    "datasetName": "vw_weekly_rv_X",
    "importMode": "DATASET_IMPORT", # DATASET_IMPORT | DIRECT
    # (optional) User-provided friendly name
    "datasetDescription": "Weekly revenue for X products",
    # aliases are synonyms; they might be systematically derived from
    # existing visuals in dashboards or other noisy heuristic methods
    "datasetAliases": [
      "weekly revenue"
    ],
    "datasetUsageCount": 10, # how many visuals does this appear in
    "dataAggregation": {
      # columnId of the primary date column that rows are preaggregated
      # on
      "dimColumnId": "955bb270-c84d-4e4b-a37f-49ffb757c30c",
      # for time based datasets, this describes the granularity of
      # rows; e.g. this is the "dataset level granularity"
```

```
      "dimGranularity" : "WEEK"
   },
   "columns": [
      {
         # a typical dimension field
         "columnId": "955bb270-c84d-4e4b-a37f-49ffb757c30c",
         "columnName": "wk_start_dt",
         # physicalType corresponds to overlay types (e.g., supported by a
         # query execution system, ATTRIBUTE (string) | INTEGER | MONEY |
         # NUMBER | TIME | TEXT
         "physicalType": "TIME",
         # (optional) semantic type information
         "semanticType": {
            # types may be uniquely defined by the typeName+subTypeName
            "typeName": "Date",
            # (optional) some types have subtypes too;
            # typeName+subTypeName together
            # uniquely define the semantic type
            "subTypeName": "Date",
            # some types have parameters; they are type specific
            "typeParameters": {
               # string key/value pairs; none defined yet
            }
         },
         # (optional) user-provided friendly name
         "columnFriendlyName": "week start",
         # longer user-provided description
         "columnDescription": "",
         # aliases may be synonyms; they may be derived from
         # visuals in dashboards or entered manually
         "columnAliases": [
            "week"
         ],
         "columnUsage": "DIMENSION", # DIMENSION | MEASURE
         "columnUsageCount": 17, # analogous to datasetUsageCount
         # if time-based dataset then this indicates that this column
         # contains the time axis and is reported at the given granularity
         "timeGranularity": "WEEK"
      },
      {
         # a typical measure field
         "columnId": "42469ffc-6824-4230-b25f-0e3ad63c1e56",
         "columnName": "X_rev_bk",
         # (optional) User-provided friendly name
         "columnFriendlyName": "week start",
         "physicalType": "NUMBER",
         "columnDescription": "revenue",
         "columnAliases": [
            "booked",
            "rev"
         ],
         "columnUsage": "MEASURE",
         "comparativeOrder": {
            # GREATER_IS_BETTER means to use the natural ordering of
            # that semanticType (or physicalType if no semanticType is
            # specified) and # greater values mean "better" from a
            # language perspective (and similarly LESSER_IS_BETTER is
            # natural reversed)
            # SPECIFIED means that the natural ordering is not used and
            # instead the user can directly configure the arbitrary
            # order here
            "useOrdering": "GREATER_IS_BETTER", # | LESSER_IS_BETTER |
            SPECIFIED
            # if useOrdering = SPECIFIED then this is the specified
            # order in least to greatest (asc) order
            "specifedOrder": [
            "F", "D", "C-", "C", "C+", "B-", "B", "B+", "A-", "A", "A+"
            ],
            # if useOrdering = SPECIFIED then this indicates how to treat
            # any unknown values that weren't included in the specifiedOrder
            # array
            "treatUndefinedSpecifiedValues " : "LEAST" | "MOST"
         },
         # the default agg for this column if set by the user (else null)
         # COUNT | DISTINCT_COUNT | MIN | MAX | MEDIAN | SUM | AVERAGE |
         # STDEV | STDEVP | VAR | VARP (note: no PERCENTILE here)
         # this agg must be in the allowedAggregations (if defined)
         "aggregation": "SUM"
         # if present, these are user-specified allowed aggregations
```

```
# if empty then no aggregations are allowed on this field
# if undefined or null then the user has not indicated what is
# allowed
# the aggs in allowedAggregations cannot also be present in
# notAllowedAggreg
# valid values:
# COUNT | DISTINCT_COUNT | MIN | MAX | MEDIAN | SUM | AVERAGE |
# STDEV | STDEVP | VAR | VARP | PERCENTILE
"allowedAggregations": [
],
# if present, these are user specified aggs that are NOT allowed
# if empty, null, or undefined then the user has not indicated
# that any are not allowed
"notAllowedAggregations": [
]
}
],
namedExpressions": [
{
   "expressionId": "42469ffc-6824-4230-b25f-0e3ad63c1e56",
   "expressionName": "Booked+Pipeline",
   "physicalType": "NUMBER", # overlay type
   "expression": "lag(sum({b767e871-5aa6-4072
                      -80b4-a179aa517f56.X_rev_bk},..
   "expressionAliases": [
      "pipeline"
   ],
   # if true then the expression is a table calc and not
   # eligible for # top/bottom
   "hasTableCalculationFunction": true,
   "isPreAggCalculationFunction": false,
   "hasAggregateFunction": false
},
# other expression aliases
],
"namedFilters": [
{
   # named filter is a predicate with a name and aliases that
   # Users define
   "filterId": "1bffb438-2667-4a8d-9125-925433f63141",
   # indicates if what kind of named filter this is:
   # NAMED_VALUE_FILTER - named filter as exists today
   # CONDITIONAL_VALUE_FILTER - this default filter is only
   # applied when the filter is not mentioned in the query
   # ENFORCED_VALUE_FILTER - the default filter
   "filterclass": "CONDITIONAL_VALUE_FILTER" # |
   ENFORCED_VALUE_FILTER
   "filterName": "Paid Users",
   "otherAliases": [
      "Paying Subscribers"
   ],
   "filterType": "CATEGORY_FILTER", # see enum type below
   "function": "contains",
   "inverse": false,
   "operandField": {
      "id":"955bb270-c84d-4e4b-a37f-49ffb757c30c" #col id
},
"constant": {
   "constantType": "COLLECTIVE", # SINGULAR, RANGE, COLLECTIVE
   "value": [
   {
      "constantType": "SINGULAR",
      "value": "PaidAnnual"
   },
   {
   "constantType": "SINGULAR",
      "value": "PaidMonthly"
   }
   ]
   ],
"namedEntities": [
   {
   "namedEntityId": "824b1611-52dc-4a80-8df6-7cbab94012d8",
   # primary friendly name for this namedEntity; this and any
   # aliases are used to match the NLQ reference to this
   # namedEntity
   "entityName": "Football Player",
   "entityDescription": "sporting player",
   "entityAliases": [
```

```
        "stats"
    ],
    "semanticEntityType": {
    # some semantic types are Entities with attributes
    # e.g. Book(Title,Publisher,Year) is a Book Entity which
    # has 3 attributes
    "typeName": "FootballPlayer",
    # some types have parameters; they are type specific (map
    # key/value strings)
    "typeParameters": {
    }
    }
    }
    # namedEntities may be defined by the _ordered_ list of
    # columns represented # by the definition; each entry refers to
    # one column in the dataset, which is a property in the
    # NamedEntity
"definition": [
{
# (required) refers to either a columnId or expressionId for this
# member # of the composite; friendly name, default formatting,
# semantic type is inherited from the referant field, unless
# overridden here
"fieldId" : "ce8d7243-4d25-4e86-9772-3fbede2fb304.yards",
# (optional) if set then use this name when presenting this property
# in # results. This may be used for metric fields where maybe you
# have # three metric fields for min(yards), max(yards), avg(yards)
# and want to have more descriptive names that our default auto-
# generated names, which will just be the underlying
# column/calcField names
"propertyName": "total yardage",
# (optional) indicate a "role" that this property plays *in* the
# namedEntity
# Example roles are:
# - PRIMARY role describes that this field is the most important
# piece of information in this namedentity.
# (e.g. player id uniquely identifies a Player entity); knowing
# which field is that unique identifier might affect how this is
# visualized (e.g. hide ID columns in tables but include them in
# the query to aggregate correctly
# (this could be the "reference" to the property in the
# corresponding semanticEntityType to make that connection)
"propertyRole": "PRIMARY",
# (optional)if this NamedEntity property is a metric (i.e. "Max
# Yardage"),
# then define the metrics here, where the fieldid is the operand
# id and aggregation describes the kind of aggregation.
# the presence of "metric" here indicates this column is being used
# as a metric
"metric": {
    # kind of aggregation
    # allowed aggs are SUM | MIN | MAX | COUNT | AVERAGE |
    # DISTINCT_COUNT | STDEV | STDEVP | VAR | VARP | MEDIAN |
    # PERCENTILE | CUSTOM
# use CUSTOM if the fieldid refers to an agg-type expression
"aggregation": "SUM",
    "aggregationFunctionParameters": {
    # only for PERCENTILE aggregation
    # "percentileValue": "90"
    }
},
# can add arbitrary designators that link visualization templates
# or other cosmetic visualization effects to fields; templates would
# have placeholder monikers which could be matched up to fields here
#"designations": [
# "PLAYER_METRIC"
#],
}
],
# implied filtering, whenever this NamedEntity is referenced to add
# this filter into the IR automatically and unconditionally
# "filters": [
# same filter format as named filters, all of these are ANDed
#together
]
# visual template: refers to a templateid of a visual template
# to render this namedEntity where fields are mapped via their
# designations
#"visualTemplateId": ". . ."
}
```

```
    ]
  },
  # other datasets
]
}
```

As indicated in the example above, various enumerations may be used in a metadata snapshot 406 to describe a data set. For example, Import Mode, Data Aggregation→Dimension Granularity (e.g., YEAR, QUARTER, MONTH, WEEK, DAY, HOUR, MINUTE), Columns→Physical Type (e.g., ATTRIBUTE (string), INTEGER, MONEY, NULL, NUMBER, TIME, TEXT), Columns→Column Usage (e.g., DIMENSION|MEASURE), Columns→Aggregation (e.g., COUNT, DISTINCT_COUNT, MIN, MAX, MEDIAN, SUM, AVERAGE, STDEV, STDEVP, VAR, VARP), Columns→Allowed Aggregations (e.g., may be manually configured to specify allowed aggregations), Columns→Not Allowed Aggregations (e.g., may be manually configure to specify not allowed aggregations), Columns→Time Granularity (e.g., YEAR, QUARTER, MONTH, WEEK, DAY, HOUR, MINUTE), Named Filter→Filter Type (e.g., CATEGORY_FILTER, NUMERIC_EQUALITY_FILTER, NUMERIC_RANGE_FILTER, DATE_RANGE_FILTER, RELATIVE_DATE_FILTER, EQUALS), Default Filter→Filter Class (e.g., CONDITIONAL VALUE FILTER, ENFORCED VALUE FILTER), and Constant→Constant Type (e.g., SINGULAR, RANGE, COLLECTIVE). Other metadata enumerations in the snapshot 406 may include default per-column filters, column hierarchies or related fields, and schema alignment between data sets.

In some embodiments, entity determination 310 may implement cell value search 405. Cell value search 405 may index over metadata describing cell values of data sets. Cell value search 405 may search the index to determine cell values for possible cell values references in natural language query 306.

Entity recognition model 410 may be machine learning model trained to identify all entities within natural language query 306. Entity recognition model 410 may utilize as inputs the results of cell value search 405, lightweight data set selection 403, metadata snapshot 406, natural language query 306, as well as other information that may be provided, such as user selected features (e.g., columns, cell values, etc.) prompted by auto-complete or query assistance features. Entity recognition model 410 may identify the entities (e.g., by identifying the specified text or characters of the entity, the offset and length of the entity within the query text string, a confidence score for the entity), and entity type.

Entity types may, in various embodiments, describe the semantic role that the entity is expected to perform in the natural language query. For example, in the question "Show me monthly sales per product for the last 3 months", entity recognition model may identify the following entities and entity types:

TABLE 1

| Entity | Entity Type |
| --- | --- |
| monthly | MONTH_DATE_GROUPBY_COLUMN |
| sales | SUM_METRIC_COLUMN |
| product | GROUPBY_COLUMN |

TABLE 1-continued

| Entity | Entity Type |
| --- | --- |
| months | RELATIVE_DATE_FILTER_LAST_MONTH_COLUMN |
| 3 | LAST_NEXT_OFFSET_FILTER_VALUE |

Entity recognition model 410 may take as input a natural language query, as well as any user-specified entity linkages as discussed above (e.g., for specific columns) to recognize entities and provide entity types. For example, ways to chunk entity spans (e.g., ranges of characters in the natural language query text string) may depend on the underlying data set schemas and actual data. For example in the question "Show me monthly sales per product for the last 3 months", "monthly" and "sales" may be treated as two entities if there are "sales" and "order_date" columns in the underlying schema. On the other hand, if the schema contains a pre-aggregated column "monthly_sales", "monthly sales" may need to be detected together as a single entity. To account for these and other scenarios, entity recognition model 410 may be schema aware to take the schema information into account when detecting entities in natural language queries utilizing metadata snapshot 406. Because metadata snapshot 406, is generated from a sub-set of available data sets, candidate data sets 404, entity recognition model 410 can avoid having to evaluate a large number of data sets. In this way, high latency and high computation cost may be avoided.

Entity recognition model 410 may be, as noted above, schema aware because of metadata snapshot 406. Entity recognition model 410 may, in some embodiments may be implemented as a deep learning model, utilizing a neural network trained to identify entities in a given query text string and other input data. In some embodiments, for example, entity recognition model 410 may implement an input layer for the model that uses fuzzy matched column names and cell values to the natural language query, and feed the sequence into a Bidirectional Encoder Representations from Transformers (BERT) encoder. In this way, the cross attention between natural language query and schemas will help model to better understand the user intent. In the output layer, a span (e.g., range of characters in the natural language query string) based entity classification layer may be implemented to assign entity recognition labels for all possible spans (up to a maximum length). For the spans that are not entities, "N/A" labels may be assigned. To further improve the recall, a gazetteer list with the fuzzy matched column names and cell values may be created and used to force the model 410 to predict entities for the matched spans, and prune overlapping spans with the matched spans.

Linkable entities (e.g., unlinked and/or conflicting entities) identified in natural language query 306 determined by entity detection model 410 may be provided to entity linkage candidate index search 420, in some embodiments. Entity linkage candidate index search 420 may retrieve a list of linking candidates for each entity. For example, for entities of type "column name", candidates may be retrieved from a column name index. The column name index, which may be generated from metadata provided (as discussed) above for the various available data sets, may be used to identify column names using known column names, column aliases or column "friendly names" associated with a column. For entities of type "cell value", candidates may be retrieved from a cell value index generated from metadata provided (as discussed) above for the various available data sets, may be used to identify column names using known distinct cell values (e.g., from String type columns) and cell value aliases. Entity linkage candidate index search 420 may allow for fuzzy queries based on the Levenshtein distance or other metric for measuring the difference between two sequences. Exact matches, tokenized versions of column or cell values (e.g., fields that include delimiters), and token synonym searches may be performed (e.g., "dod or day, day over day," "wow, week, week over week," "year to date, ytd," "date, day," etc.). In some embodiments, a column search may search both column and cell values, with column values boosted over cell values. Similarly, a cell value search may search both cell values and column values, with cell values boosted over column values. Candidate entity linkages (e.g., a mapping between an entity and column or cell value) returned by entity linkage candidate index search 420 may be limited, in some embodiments, to a top X number of results per entity. Query input bundle 408 may include the natural language query (402), user-specified entity linkages 404, and per-entity linkage candidates determined for recognized entities (e.g., limited to the top X number of linkage candidates).

Figure 5:
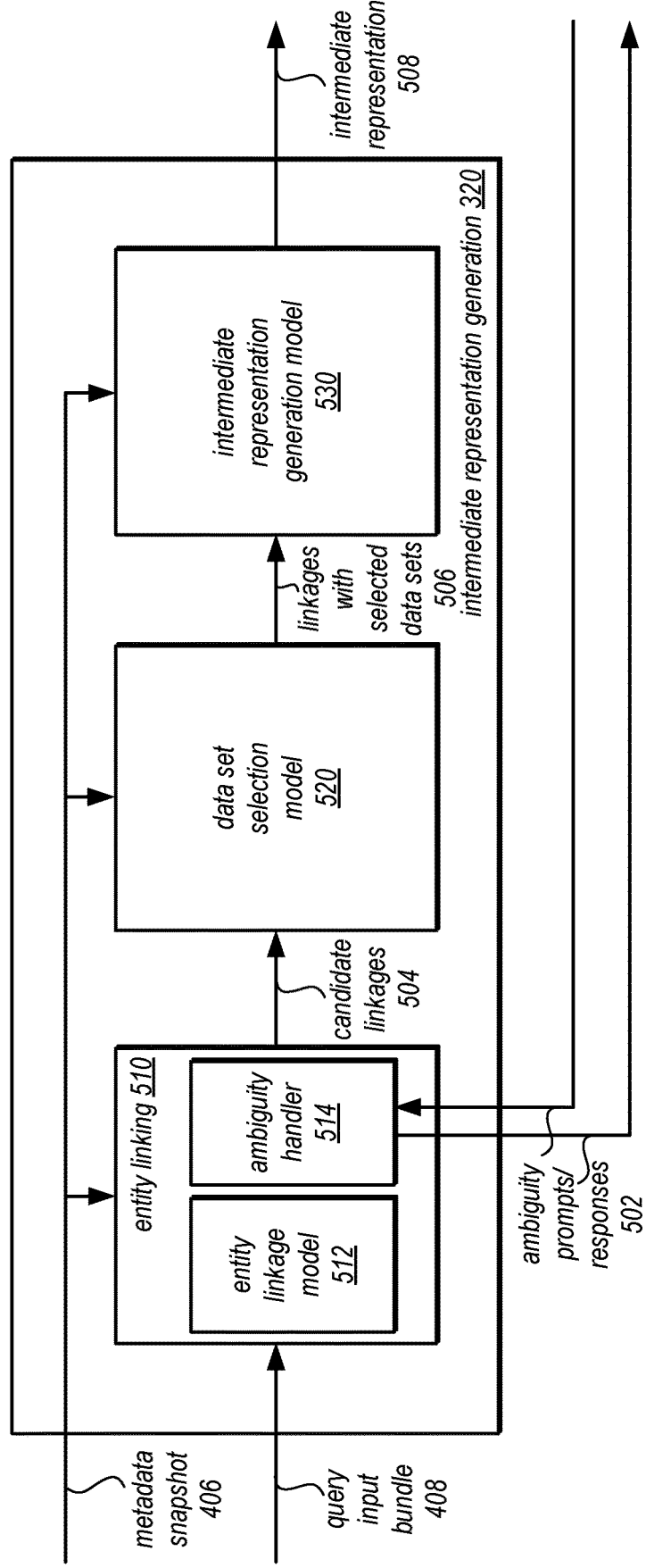
FIG. 5 is a logical block diagram illustrating intermediate representation generation for processing a natural language query, according to some embodiments.
Figure 6:
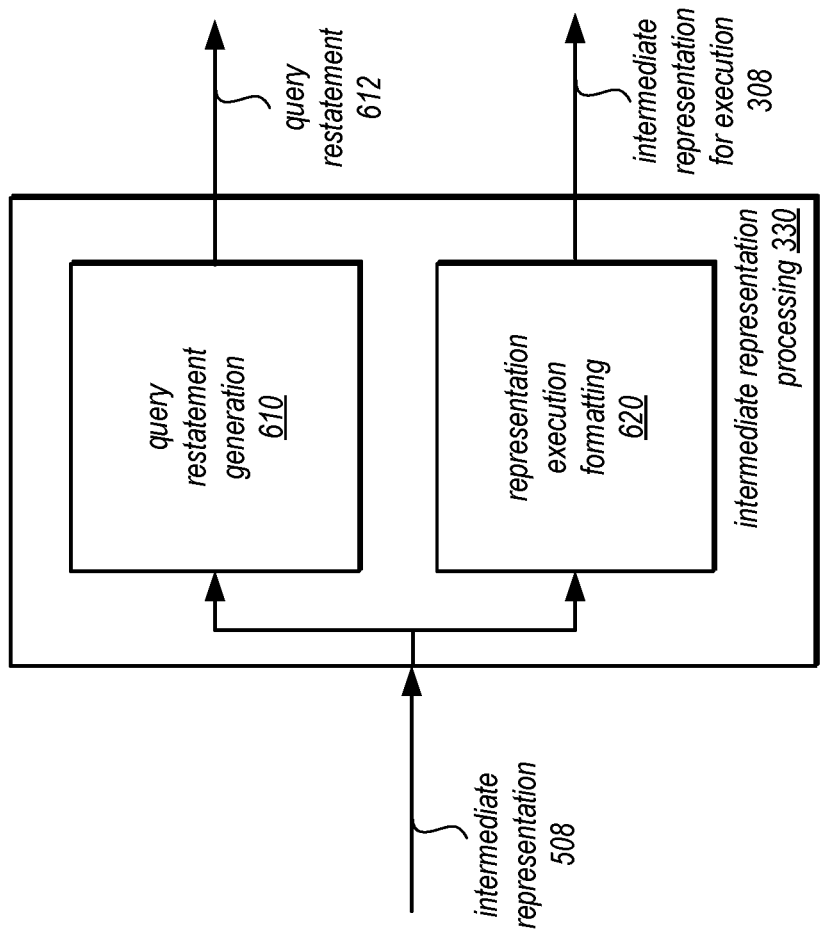
FIG. 6 is a logical block diagram illustrating intermediate representation processing for processing a natural language query, according to some embodiments.

FIG. 5 is a logical block diagram illustrating intermediate representation generation for processing a natural language query, according to some embodiments. As indicated at 408, query input bundle may be received at entity linking stage 510. Entity linking stage 510 may include entity linkage model 512. Entity linkage model 512 may rerank all linkage candidates for each entity based on the context (e.g., metadata snapshot 406) to produce one candidate linked natural language query per potential data set (e.g., 1 per distinct data set across all entity link options) and, for each, pick the best link options of that data set). For example, the following table may illustrate the output linkages of the entity linkage model 512:

candidate is a cell, the physical type of its corresponding column may be provided). For example,

[CLS] whats the WoW change in [ms] revenue [me] for sponsored ads [entityType] COLUMN A linear layer may then be applied on the classification token [CLS] to produce a logit score (BERT score). During training, cross-entropy loss may be calculated on all the linking candidates, including one positive candidate and at most Y (e.g., 63) negative candidates. The positive candidate may come from the annotated ground truth, and the negative candidates may come from index search results. During inference, each linking candidate may be fed to the BERT model independently and may be assigned a BERT score Stage 2 of entity linkage model 512 may be a boosting model. The BERT scores, combined with other meta feature scores, may then be used as features for boosting classification models. The meta feature scores may include (1) the 3-gram character-level Jaccard distances between the entity text and the candidate text; (2) the 3-gram character-level Jaccard distances between the entity text and the candidate alias; (3) the 1-gram token-level Jaccard distance between the entity text and the candidate text; (4) the exact match score between entity and candidate texts; and (5) the binary indicator of whether one of the entity or candidate text is a subset of the other.

In various embodiments, entity linking 510 may implement ambiguity handler 514. Ambiguity handler 514 may implement various ambiguity prompts and response handling, as indicated at 502, including evaluating confidence scores to determine whether a minimum confidence threshold is achieved and, if not, prompting a user with multiple candidate linking options, as discussed in detail below. In another example, the difference between a top-ranked candidate linkage and a next linkage may be determined and, if less than a threshold amount, cause prompts for candidate linkages to be made to a user so that the user can select another or confirm the top-ranked linkage for an entity. In some embodiments, ambiguity prompts 502 may be made before processing of natural language query 306 proceeds to data set selection model 520 (e.g., if an entity has not candidate linkage for a data set above a minimum confidence threshold). In some embodiments. ambiguity prompts

TABLE 2

| Entity | Entity Type | Linkage | Linkage Type |
|---|---|---|---|
| monthly | MONTH _DATE_GROUPBY_COLUMN | Order Date | Time column |
| sales | SUMMETRIC_COLUMN | Sales | Number column |
| product | GROUPBY_COLUMN | Product Name | Attribute column |
| months | RELATIVE_DATE_ FILTER _LAST_MONTH_COLUMN | Order-Date | Time column |
| 3 | LAST_NEXT_OFFSET_FILTER_VALUE | N/A | LITERAL |

Entity linkage model 512 may be implemented as a deep learning model, utilizing a neural network trained to identify and rank entity linkages in a given query text string and other input data, in various embodiments. For example, entity linkage model 512 may be implemented according to the following stages. Stage 1 may be a BERT encoder component. For each linking candidate of an entity, an input to the entity linkage BERT model using (1) the natural language query context; (2) the entity type; (3) column name if the candidate is a column or cell value if the candidate is a cell; and (4) the physical type of the column (if the 502 may be provided along with a natural language query result, which may provide a user with an opportunity to refine the query result by providing a selection, which may cause processing of the natural language query using the selection.

Candidate linkages for the natural language query, as indicated at 504, maybe provided to data set selection model 520. Data set selection model 520 may, in some embodiments, implement a deep learning model that utilizes a neural network to rank linked datasets such that the top K data sets can be selected. For example, given linked entities from entity linking 510 prediction, data set selection model 520 may extract a subset of datasets that were linked. For each candidate dataset, data set selection model 520 may then use a denoising autoencoder for pretraining sequence-to-sequence models (e.g., a fine-tuned BART encoder) to encode the (1) NLQ (natural language query) and (2) Column names.

For example,

[CLS] what is the weekly monthly paid user trend [SEP] provisioned reader email ses A linear layer may then be applied on the classifier token [CLS] representation for projection. Finally, a softmax may be used on the logit scores of all datasets, and compute scores for each candidate dataset. During training of data set selection model 520, negative random samples (e.g., four) may be gathered for each positive training example, and cross-entropy loss may be used to boost the scores of the positive candidates. Data set selection model 520 may then filter down the set of datasets to make predictions over during the intermediate representation generation model phase thereby managing latency; but the output of the data set selection model 520 score can also be used in conjunction with the intermediate representation generation model 530 score, in some embodiments, to produce a re-ranked ordering of predictions to improve end-to-end accuracy.

As indicted at 506, linkages with selected data sets 506 may be provided to intermediate representation generation model 530 along with data set metadata snapshot 406 to provide an intermediate representation 508 of the natural language query. Intermediate representation generation model 530 responsible for predicting the intermediate representation given the natural language query and upstream predictions from entity recognition model 410, entity linkage model 512 and data set selection model 520. In at least some embodiments, intermediate representation 508 may generate multiple intermediate representations of natural language query 306 with corresponding scores, take a top X number of intermediate representations according to the corresponding scores, and select a best scoring one of the intermediate representations to return as the intermediate representation 508. An intermediate representation generated by intermediate generation model 530 may include the data set to access along with various information to generate the result such as various metrics to be determined for the natural language query from the data set (e.g., including functions such as aggregation, like SUM, operands for the function), a group by list, filters to apply, among other features to perform the natural language query.

In at least some embodiments, intermediate representation generation model 530 may predict the intermediate representation tree structure based on the predicted linked entities and tables from upstream algorithms. Intermediate representation generation model 530 model may include three main components (1) Encoder (2) Top-down Decoder and (3) Bottom-up business logic constraint, in some embodiments. Intermediate representation entity generation model 530 may be responsible for encoding the natural language query and schema information. Specifically, the textual inputs (1) natural language query (2) Column Names may be encoded with a pretrained BART encoder. All the inputs may be concatenated together with a SEP token as separator. The encoded representation may then be consumed by a Transformer decoder.

During inference, the entity linkage model 512 linked columns and named expressions may be prioritized in the encoder to alleviate out-of-bound issue due to fixed length limits of the LM encoder. Specifically, the entity linkage model 512-linked columns may be first appended and then append the remaining columns if the length limit of the LM encoder allows.

The top-down decoder of intermediate representation generation model 530 may be implemented so that the representations of columns and entities from the encoder are extracted, and then concatenated with grammar embeddings. Thus the target embeddings consists of: (1) Grammar representation, (2) Column representation, and (3) Entity representation. These target embeddings corresponds to action vocabularies, and they represent the possible actions that the decoder can take at each step.

At each decoding step, the NLQ2IR decoder uses one of the three following components:

1. Grammar-based decoder: The grammar-based decoder chooses a production rule among one of the dynamic grammar production rules. These dynamic grammar production rules are extracted from the training data. During inference, the transformer decoder would then compute the output token/action probability of each production rule among the above rules with other rules masked out. During training, all action vocabularies are available for the decoder to choose from, with a pointwise cross-entropy loss on each action step.

2. Column CopyNet: When the decoder expands a COLUMN node, the transformer decoder uses a "copy mechanism" to choose the column. The encoded tokens of each column are mean-pooled and projected with feed-forward layer to form the column-action portion of the output token embedding matrix. During column expansion step, the transformer decoder computes the output token/action probability, which represents the probability of copying the corresponding column.

3. Value CopyNet: Similar to Column CopyNet, a copy mechanism is used to assign values in the IR. Possible values are extracted from AES/NEL linked values.

The bottom up business logic constraints of intermediate representation generation model 530 may allow for business logic to provide hard constraint and hints based on schema information (e.g. column type) and entity recognition model 410 and entity linkage model 512 predictions. Note that these business logic may only be used during inference, in some embodiments. For example, during training, the NLQ2IR model may not be constrained or provided with hints on the search space. It may be allowed to learn to generate the parse tree without these constraints and hints. Thus these business logic rules may not hurt the generalizability of the trained model.

In the following example, entity recognition model 410 labeled a mention with COUNT METRIC COLUMN and entity linkage model 512 linked it to column total_sd. The business logic on aggregation-metric-column component would impose several constraints during decoding:

1. Decoded AST must have a Metrics node

2. Since the aggregation type of the entity recognition model 410 entity type is COUNT, the decoded AST must have a COUNT node as one of Metrics' children 3. Since entity linkage model 512 linked the entity to the column total_sd, the decoded AST must have a leaf column node total_sde with ancestors Metrics→COUNT FIG. 6 is a logical block diagram illustrating intermediate representation processing for processing a natural language query, according to some embodiments. Intermediate representation 508 may be provided for intermediate representation processing 330. In various embodiments, representation execution formatting 620 may be implemented. Representation execution formatting 620 may transform the representation into a business intelligence service 210 specific format (e.g., an API or set of APIs to invoke analysis and visualization 214). In some embodiments, other execution systems for the query (e.g., the data storage system where the query is stored, for instance) may be used to execute the intermediate representation for execution 308.

In various embodiments, query restatement generation 610 may be implemented. Query restatement generation 610 may generate from intermediate representation a query restatement 612. Query restatement 612 may offer natural language query performance benefits. For example, a developer can easily check result to see if the IR is correct or not. The restatement 612 may provide better interaction with user. A user can correct query based on the interpretable result, and increase user confidence in the system and erase frictions.

Query restatement generate may implement a template based approach to generate restatements based on entities, linked columns and intermediate representation structures. Some example templates are listed below:
Showing ${METRICS} for ${FILTER.CELL_VALUE}
Showing ${METRICS} for ${FILTER.CELL_VALUE} for ${DATASET} dataset.
Showing ${METRICS} for ${FILTER.CELL_VALUE} grouped by ${GROUP_BY} for ${DATASET} data
Showing ${METRICS} for ${FILTER.CELL_VALUE} grouped by ${GROUP_BY} ordered by ${ORDER Query restatement 612 may be displayed along with a result, in some embodiments. In some embodiments, query restatement 612 may provide interactive elements, allowing a user to select items in the restatement to display source information (e.g., column, operation, and data set name). In at least some embodiments, query restatement 612 may performed and/or implemented with intermediate generation stage 530.

Figure 7:
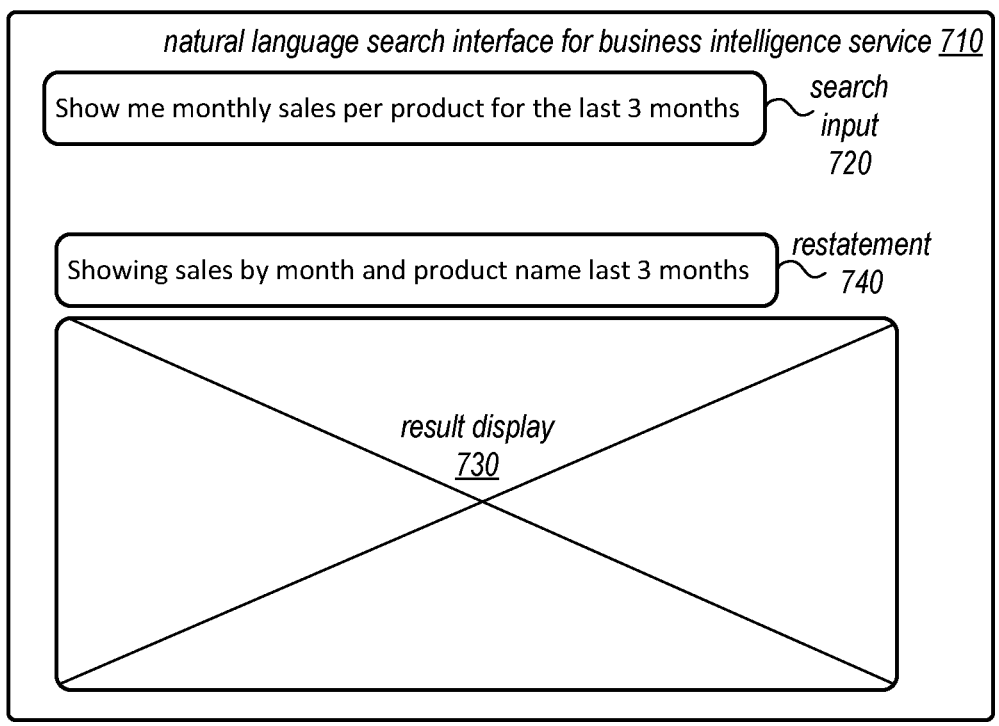
FIG. 7 is a logical block diagram illustrating an example user interface for providing query restatements, according to some embodiments.
Figure 7:
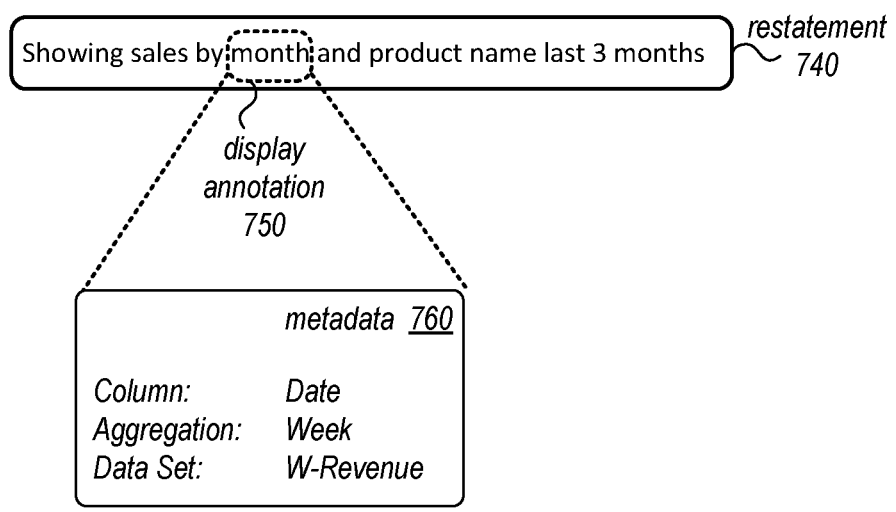

FIG. 7 is a logical block diagram illustrating an example user interface for providing query restatements, according to some embodiments. As indicated at 710, a natural language search interface for business intelligence service may include a search input element 720 (e.g., a text entry user interface element or other selectable user interface element for entering a natural language query, such as via a voice command or other audio input to enter the natural language query).

The text of the natural language query may be displayed at search input 720, in some embodiments. For example, a natural language query search "Show me monthly sales per product for the last 3 months" may be entered. After performing intermediate representation generation and executing the natural language query according to the intermediate representation, a result display 730 may be provided (e.g., illustrating various tables, charts, graphs, or other visualizations of text, symbols, and/or other result representations). Additionally, restatement 740 may be displayed along with result display 730 (e.g., "Showing sales by month and product name last 3 months").

In some embodiments, restatement 740 may offer an interactive user interface for users to indicate (e.g., via mouse, touch, gesture or other input device or technique) a word or portion of restatement 740 to request display of annotation, such as annotation display. While some portions or words of restatement 740 may have no annotation (e.g., template words like "Showing", words populated in the template, such as "month" may have corresponding metadata 760 displayed, such as a column, operation (e.g., aggregation, and data set. Although not illustrated, in some embodiments, interface 760 may support a user interaction to edit metadata 760, which could trigger a re-execution of the natural language query, as discussed below with regard to FIG. 9 or to be stored as a result for improving modeling of intermediate representations. In some embodiments, submitted edits may be stored (e.g., by data set metadata management 340).

Figure 8:
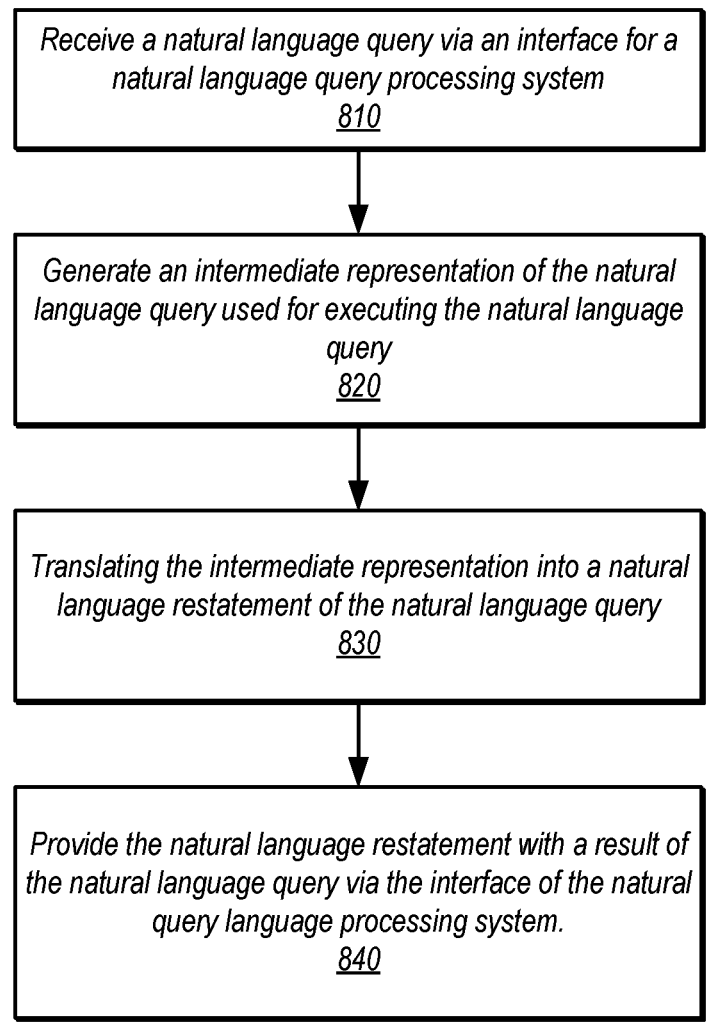
FIG. 8 is a high-level flowchart illustrating various methods and techniques to implement providing query restatements for explaining natural language query results, according to some embodiments.

Although FIGS. 2-7 have been described and illustrated in the context of a provider network implementing a business intelligence service, the various components illustrated and described in FIGS. 2-7 may be easily applied to other natural query language processing techniques, systems, or devices that assistance performance of natural language queries to data sets. As such, FIGS. 2-7 are not intended to be limiting as to other embodiments of a system that may implement natural language query processing. FIG. 8 is a high-level flowchart illustrating various methods and techniques to implement providing query restatements for explaining natural language query results, according to some embodiments.

Various different systems and devices may implement the various methods and techniques described below, either singly or working together. For example, a business intelligence service such as described above with regard to FIGS. 2-7 may implement the various methods. Alternatively, a combination of different systems and devices may implement these methods. Therefore, the above examples and or any other systems or devices referenced as performing the illustrated method, are not intended to be limiting as to other different components, modules, systems, or configurations of systems and devices.

As indicated at 810, a natural language query may be received via an interface for a natural language query processing system, in some embodiments. For example, the natural language query may be entered via a graphical user interface, command line interface, or other interface (e.g., an API). The natural language query may not explicitly identify tables, data stores, or other locations of specific data sets to query, in some embodiments.

As indicated at 820, an intermediate representation of the natural language query may be generated that is used for executing the natural language query. For example, as discussed in detail above with regard to FIGS. 3-6, entity determination stage 310 may determine or otherwise recognize the entities in a natural language query, as discussed in detail above with regard to FIG. 4. Intermediate representation generation 320 may determine the linkages, data sets, and intermediate representation of a natural language query for execution, as discussed in detail above with regard to FIG. 5. In FIG. 6, intermediate representation processing 330 as discussed in detail above may enhance and ready an intermediate representation for execution.

As indicated at 830, the intermediate representation may be translated into a natural language restatement of the natural language query, in various embodiments. For example, a set of templates may be maintained that correspond to different combinations of entities, operations and other intermediate representation features. Based on the intermediate representation, a template with a matching combination of entities, operations and other intermediate representation features may be identified for generating the natural language restatement. In various embodiments, templates may include fields (sometimes referred to as spans) which may be populated using the entities, operations, and/other features, such as linked columns determined for or recognized in the natural language query. As discussed above, data set, operation type, and/or column/cell value information for these fields may be provided as annotations.

Although templates are discussed above for providing natural language query restatements, in other embodiments a machine learning model, trained to decode intermediate representations into natural language may be utilized to generate the natural language query restatements.

As indicated at 840, the natural language restatement may be provided with a result of the natural language query via the interface of the natural language processing system, in some embodiments. For example, a display location for the result may include a space reserved for the restatement.

Figure 9:
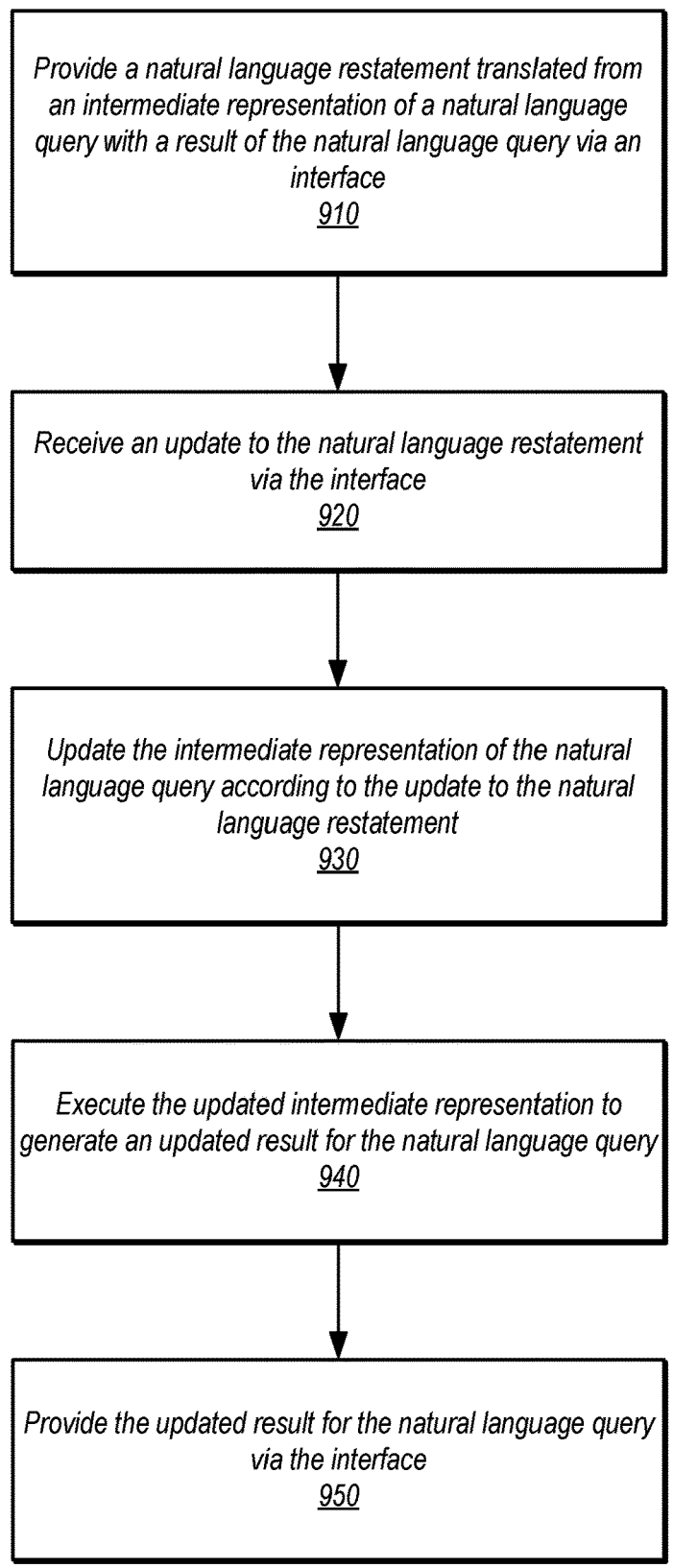
FIG. 9 is a high-level flowchart illustrating various methods and techniques to implement updating natural language query results through query restatement feedback, according to some embodiments.

FIG. 9 is a high-level flowchart illustrating various methods and techniques to implement updating natural language query results through query restatement feedback, according to some embodiments. As indicated at 910, a natural language restatement translated from an intermediate representation of a natural language query may be provided with a result of the natural language query via an interface, such as the restatement displayed in FIG. 7 discussed above. As indicated at 920, an update to the natural language restatement may be received via the interface, in some embodiments. For example, the update may include an update to the language itself (e.g., to update how restatements are written to better communicate the natural language query). In some embodiments, the update may be an update to an annotation provided with the natural language restatement. In some embodiments, the update to the annotation may be stored and used for training a machine learning model (e.g., the intermediate representation generation model 530 in FIG. 5). For example, the input natural language query, the intermediate representation with the annotation may be stored as part of a training data set. In some embodiments, this training data set may be used to generate a user-specific intermediate representation generation model and/or may be used to update an intermediate representation generation model applied for multiple user natural language queries.

As indicated at 930, the intermediate representation of the natural language query may be updated according to the update to the natural language restatement, in some embodiments. For example, if a data set, column or operation is updated, then the corresponding information in the intermediate representation for that updated portion may be changed. As indicated at 940, the updated intermediate representation may be executed or otherwise used to generate an updated result for the natural language query. As indicated at 950, the updated result for the natural language query may be provided via the interface.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 10:
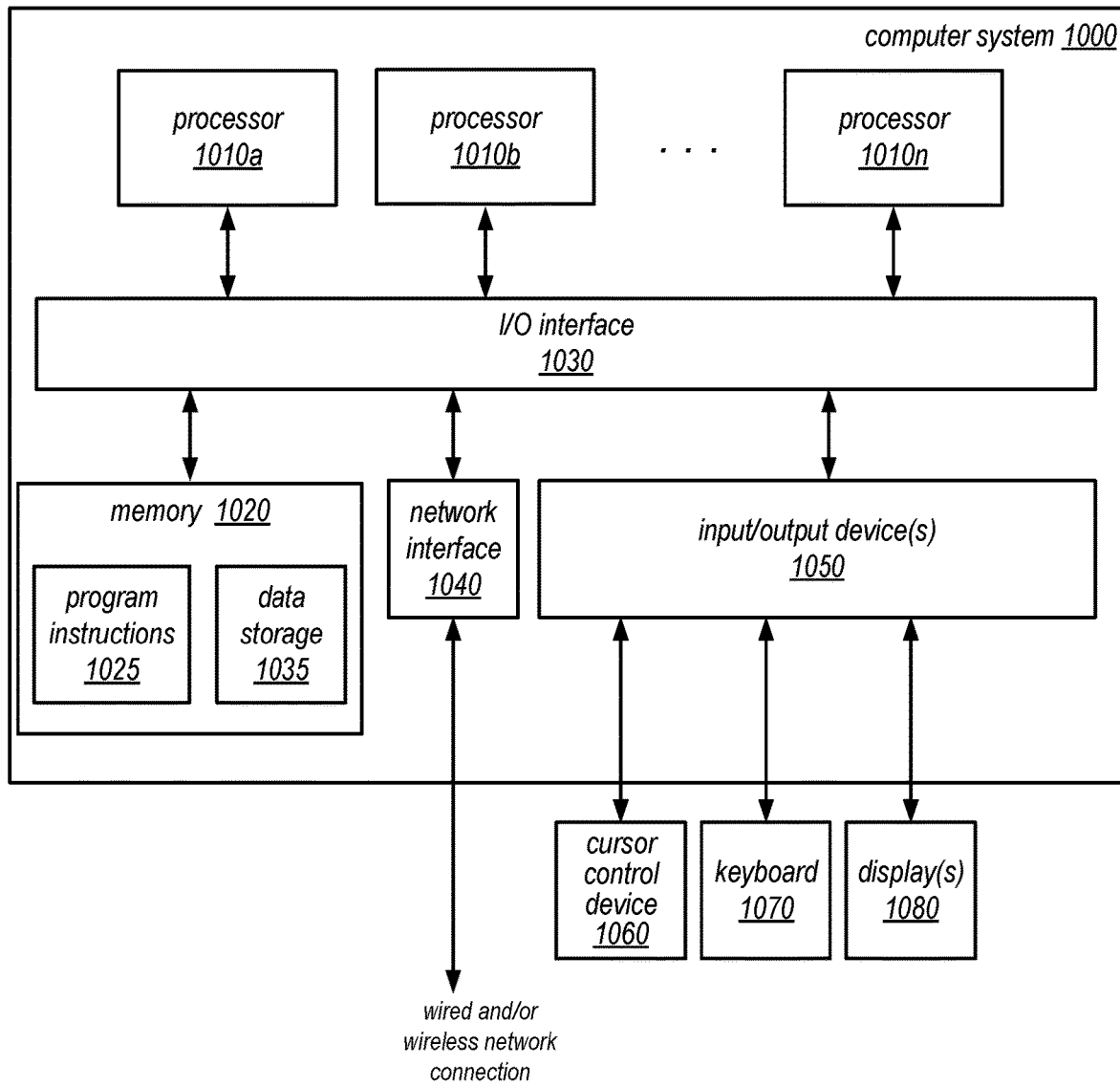
FIG. 10 illustrates an example system configured to implement the various methods, techniques, and systems described herein, according to some embodiments.

Embodiments of providing query restatements for explaining natural language query results as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, computing system compute system, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, may implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machineprocessable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
  at least one processor; and
  a memory, storing program instructions that when executed by the at least one processor, cause the at least one processor to implement a natural language query processing system that provides access to a plurality of fixed schema data sets, the natural language query processing system configured to:
    receive a natural language query via an interface for the natural language query processing system;
    process the natural language query through a natural query language processing pipeline to generate an intermediate representation of the natural language query used for executing the natural language query;
    determine from the intermediate representation both a natural language restatement of the intermediate representation and a format for executing the intermediate representation of the natural language query that invokes a determined type of visualization as part of generating a result for the natural language query, wherein to determine the natural language restatement of the intermediate representation, the natural language query processing system is configured to translate the intermediate representation into a natural language restatement of the natural language query;
    cause the natural language query to be executed according to the determined format for the intermediate representation; and
    cause the natural language restatement to be displayed with the result, including the invoked type of visualization, of the natural language query via the interface of the natural language query processing system.

2. The system of claim 1, wherein the query processing system is further configured to:
  receive, via the interface, a selection of a portion of the natural language restatement; and
  return, via the interface, an annotation that describes the selected portion of the natural language restatement.

3. The system of claim 1, wherein the query processing system is further configured to:
  receive, via the interface, an update to the natural language restatement;
  update the intermediate representation according to the update to the natural language restatement;
  execute the updated intermediate representation to generate an updated result for the natural language query; and
  provide, via the interface, the updated result for the natural language query.

4. The system of claim 1, wherein the natural language query processing system is implemented as part of a business intelligence service offered by a provider network.

5. A method, comprising:
  receiving a natural language query via an interface for a natural language query processing system that provides access to a plurality of fixed schema data sets;
  generating an intermediate representation of the natural language query used for executing the natural language query;
  determining, from the intermediate representation, both a natural language restatement of the intermediate representation and a format for executing the intermediate representation of the natural language query that invokes a determined type of visualization as part of generating a result for the natural language query, wherein determining the natural language restatement of the intermediate representation comprises translating the intermediate representation into a natural language restatement of the natural language query; and
  providing the natural language restatement with a result, including the determined type of visualization, of the natural language query from one of the fixed schema data sets via the interface of the natural language query processing system.

6. The method of claim 5, wherein translating the intermediate representation into a natural language restatement of the natural language query comprises:
  identifying one restatement template from a set of restatement templates that matches the intermediate representation; and
  populating one or more fields in the restatement template from the intermediate representation.

7. The method of claim 5, further comprising:
  receiving, via the interface, a selection of a portion of the natural language restatement; and
  returning, via the interface, an annotation that describes the selected portion of the natural language restatement.

8. The method of claim 7, wherein the annotation includes a cell value as a source of the selected portion.

9. The method of claim 7, wherein the annotation is stored as part of metadata for the one fixed schema data set accessed to perform the natural language query.

10. The method of claim 5, further comprising:
receiving, via the interface, an update to the natural language restatement;
updating the intermediate representation according to the update to the natural language restatement;
executing the updated intermediate representation to generate an updated result for the natural language query; and
providing, via the interface, the updated result for the natural language query.

11. The method of claim 10, wherein the update to the natural language restatement modifies an annotation of a portion of the natural language restatement provided via the interface.

12. The method of claim 5, further comprising:
receiving, via the interface, an update to the natural language restatement; and
storing the update to the natural language restatement as part of training data for updating a machine learning model to generate the intermediate representation.

13. The method of claim 5, wherein the natural language query processing system is implemented as part of a database system.

14. One or more non-transitory, computer-readable storage media, storing program instructions that when executed on or across one or more computing devices cause the one or more computing devices to implement:
receiving a natural language query via an interface for a natural language query processing system;
generating an intermediate representation of the natural language query used for executing the natural language query;
determining, from the intermediate representation, both a natural language restatement of the intermediate representation and a format for executing the intermediate representation of the natural language query that invokes a determined type of visualization as part of generating a result for the natural language query, wherein, in determining the natural language restatement of the intermediate representation, the program instructions cause the one or more computing devices to implement translating the intermediate representation into a natural language restatement of the natural language query; and
causing the natural language restatement to be displayed with a result, including the determined type of visualization, of the natural language query via the interface of the natural language query processing system.

15. The one or more non-transitory, computer-readable storage media of claim 14, wherein, in translating the intermediate representation into a natural language restatement of the natural language query, the program instructions cause the one or more computing devices to implement:
identifying one restatement template from a set of restatement templates that matches the intermediate representation; and
populating one or more fields in the restatement template from the intermediate representation.

16. The one or more non-transitory, computer-readable storage media of claim 14, storing further instructions that when executed by the one or more computing devices, cause the one or more computing devices to further implement:
receiving, via the interface, a selection of a portion of the natural language restatement; and
returning, via the interface, an annotation that describes the selected portion of the natural language restatement.

17. The one or more non-transitory, computer-readable storage media of claim 16, wherein the annotation includes a column name as a source of the selected portion.

18. The one or more non-transitory, computer-readable storage media of claim 16, wherein the annotation includes an operation of the selected portion.

19. The one or more non-transitory, computer-readable storage media of claim 14, storing further instructions that when executed by the one or more computing devices, cause the one or more computing devices to further implement:
receiving, via the interface, an update to the natural language restatement;
updating the intermediate representation according to the update to the natural language restatement;
executing the updated intermediate representation to generate an updated result for the natural language query; and
providing, via the interface, the updated result for the natural language query.

20. The one or more non-transitory, computer-readable storage media of claim 14, wherein the natural language query processing system is implemented as part of a service offered by a provider network.

* * * * *